(12) United States Patent
Makino et al.

(10) Patent No.: US 11,693,291 B2
(45) Date of Patent: Jul. 4, 2023

(54) OPTICAL WAVEGUIDE DEVICE AND METHOD OF MANUFACTURING OPTICAL WAVEGUIDE DEVICE

(71) Applicant: Fujitsu Optical Components Limited, Kawasaki (JP)

(72) Inventors: Shuntaro Makino, Kawasaki (JP); Yoshinobu Kubota, Yokohama (JP); Yasuhiro Ohmori, Sapporo (JP); Masaharu Doi, Sapporo (JP); Shintaro Takeuchi, Sapporo (JP)

(73) Assignee: Fujitsu Optical Components Limited, Kawasaki (JP)

(\*) Notice: Subject to any disclaimer, the term of this patent is extended or adjusted under 35 U.S.C. 154(b) by 155 days.

(21) Appl. No.: 17/169,983

(22) Filed: Feb. 8, 2021

(65) Prior Publication Data
US 2021/0325761 A1 Oct. 21, 2021

(30) Foreign Application Priority Data
Apr. 21, 2020 (JP) ................... 2020-075237

(51) Int. Cl.
*G02F 1/225* (2006.01)
*G02F 1/03* (2006.01)
*F21V 8/00* (2006.01)

(52) U.S. Cl.
CPC .......... *G02F 1/225* (2013.01); *G02B 6/0065* (2013.01); *G02F 1/0316* (2013.01); *G02F 2201/07* (2013.01)

(58) Field of Classification Search
CPC .... G02F 1/225; G02F 1/0316; G02F 2201/07; G02B 6/0316; G02B 6/0065
See application file for complete search history.

(56) References Cited

U.S. PATENT DOCUMENTS 5,404,412 A * 4/1995 Seino ............... G02F 1/0123
385/132
5,680,497 A * 10/1997 Seino ............... G02F 1/0123
385/2

(Continued)

FOREIGN PATENT DOCUMENTS

JP 2008-089936 A 4/2008
JP 2008-233513 A 10/2008

(Continued)

OTHER PUBLICATIONS

Honardoost et al., Towards subterahertz bandwidth ultracompact lithium niobate electrooptic modulators, Optics Express, V. 27, N. 5, 2019 (Year: 2019).*

(Continued)

*Primary Examiner* — Peter Radkowski
(74) *Attorney, Agent, or Firm* — Staas & Halsey LLP

(57) ABSTRACT

An optical waveguide device has a substrate, an intermediate layer, a thin-film LN layer containing an X-cut lithium niobate, and a buffer layer stacked on the substrate, and an optical waveguide having a ridge shape formed in the thin-film LN layer. The optical waveguide device includes a plurality of electrodes provided, respectively, at a first side and a second side of the optical waveguide. The electrodes are disposed so that respective bottom surfaces thereof are at positions lower than a position of a surface of the buffer layer.

1 Claim, 7 Drawing Sheets

(56) References Cited

U.S. PATENT DOCUMENTS

| | | | | |
|---|---|---|---|---|
| 6,255,148 | B1* | 7/2001 | Hara | H01L 29/66757 |
| | | | | 257/E21.415 |
| 6,873,749 | B2* | 3/2005 | Gibson | G02F 1/225 |
| | | | | 385/129 |
| 8,644,647 | B2* | 2/2014 | Ichikawa | G02F 1/2255 |
| | | | | 385/2 |
| 9,244,296 | B2* | 1/2016 | Iwatsuka | G02F 1/035 |
| 2003/0156474 | A1* | 8/2003 | Gibson | G02F 1/225 |
| | | | | 365/200 |
| 2009/0231686 | A1* | 9/2009 | Atkins | G02B 6/12002 |
| | | | | 385/28 |
| 2009/0324156 | A1* | 12/2009 | Kinpara | G02F 1/0356 |
| | | | | 385/2 |
| 2010/0232736 | A1* | 9/2010 | Ichikawa | G02F 1/0356 |
| | | | | 385/2 |
| 2015/0138619 | A1* | 5/2015 | Iwatsuka | G02F 1/035 |
| | | | | 359/245 |
| 2018/0011348 | A1* | 1/2018 | Yanagawa | G02F 1/0316 |
| 2021/0325760 | A1* | 10/2021 | Makino | G02F 1/225 |

FOREIGN PATENT DOCUMENTS

| | | |
|---|---|---|
| JP | 2014-106397 A | 6/2014 |
| JP | 2014-142411 | 8/2014 |
| JP | 2016-191798 A | 11/2016 |
| JP | 2019-45880 | 3/2019 |

OTHER PUBLICATIONS

Office Action, dated Oct. 6, 2022, in U.S. Appl. No. 17/165,562 (16 pp.).

U.S. Appl. No. 17/165,562, filed Feb. 2, 2021, Shuntaro Makino et al., Fujitsu Optical Components Limited.

Notice of Allowance, dated Feb. 27, 2023, in U.S. Appl. No. 17/165,562 (14 pp.).

* cited by examiner

OPTICAL WAVEGUIDE DEVICE AND METHOD OF MANUFACTURING OPTICAL WAVEGUIDE DEVICE

CROSS REFERENCE TO RELATED APPLICATIONS

This application is based upon and claims the benefit of priority of the prior Japanese Patent Application No. 2020-075237, filed on Apr. 21, 2020, the entire contents of which are incorporated herein by reference.

FIELD

The embodiments discussed herein related to an optical waveguide device and a method of manufacturing an optical waveguide device.

BACKGROUND

To increase the speed of optical communication, high-performance optical devices are indispensable. Among optical devices, a conventional LN optical modulator uses a lithium niobate ($LiNbO_3$, hereinafter, LN) substrate and, thus, is able to obtain favorable characteristics in terms of insertion loss and transmission characteristics. On the LN substrate, an optical waveguide is formed by diffusing titanium (Ti). While conventional LN optical modulators (hereinafter, bulk LN modulators) that use such an LN substrate are widely used, the size thereof is increasing.

In recent years, demand for smaller optical devices has increased and reduction of the size of LN optical modulators used in optical transceivers is also being studied. A thin-film LN optical modulator that uses a thin-film LN is one such LN optical modulator having a smaller size. The thin-film LN optical modulator has a Mach-Zehnder interferometer structure and a structure in which layers such as an intermediate layer, a thin-film LN, a buffer layer, and electrodes are provided on a substrate.

Arts related to a thin-film LN optical modulator, for example, have a lithium niobate film (c-axis is oriented orthogonal to a main surface of a single crystal substrate) formed on a single crystal substrate by epitaxial growth. There is an optical modulator in which a convex ridge-shaped portion is formed in a lithium niobate film as an optical waveguide and a buffer layer and an electrode are stacked at the ridge-shaped portion. The buffer layer has a step due to the protrusion of the ridge-shaped portion and is coated, whereby damage to the ridge-shaped portion is reduced (for example, refer to Japanese Laid-Open Patent Publication No. 2019-45880, U.S. Published Patent Application No. 2015/0138619, and Japanese Laid-Open Patent Publication No. 2014-142411). U.S. Published Patent Application No. 2015/0138619 is a US patent application corresponding to Japanese Laid-Open Patent Publication No. 2019-45880 while Japanese Laid-Open Patent Publication No. 2014-142411 is the base application on which the priority of Japanese Laid-Open Patent Publication No. 2019-45880 is claimed.

SUMMARY

According to an aspect of an embodiment, an optical waveguide device has a substrate, an intermediate layer, a thin-film LN layer containing an X-cut lithium niobate, and a buffer layer stacked on the substrate, and an optical waveguide having a ridge shape formed in the thin-film LN layer. The optical waveguide device includes a plurality of electrodes provided, respectively, at a first side and a second side of the optical waveguide. The electrodes are disposed so that respective bottom surfaces thereof are at positions lower than a position of a surface of the buffer layer.

An object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF THE INVENTION

First, problems associated with the related art are discussed. In the conventional thin-film LN optical modulator, light waves to the optical waveguide are strongly confined and therefore, when a border between air and the buffer layer is close to the optical waveguide, scattering loss occurs due to roughness of the sidewalls of the optical waveguide. The roughness of the sidewalls corresponds to numerous minute burrs that occur on sidewalls of a protruding portion when the ridge-shaped portion is formed having this protruding shape. Further, when the buffer layer is formed covering the ridge-shaped portion, at sidewall portions of the buffer layer, roughness of the sidewalls thereof similarly occurs.

To reduce scattering loss due to sidewall roughness, the buffer layer has to be thicker. On the other hand, electric field efficiency of an optical modulator increases the shorter is the distance between the electrode and the optical waveguide and therefore, to increase the electric field efficiency and reduce the size of the optical modulator, the buffer layer has to be thinner. In this manner, in the conventional thin-film LN optical modulator, regarding the thickness of the buffer layer, the tradeoff between reducing scattering loss and improving the electric field efficiency (size reduction) is problematic, and a compact thin-film LN optical modulator in which the scattering loss is low and the electric field efficiency is improved has not been realized.

Further, the art described in Japanese Laid-Open Patent Publication No. 2019-45880, U.S. Published Patent Application No. 2015/0138619, and Japanese Laid-Open Patent Publication No. 2014-142411 relates to implementing a Z-cut thin-film LN optical modulator. Nonetheless, in a thin-film LN optical modulator using a Z-cut for the thin-film LN, electric field has to be applied in a vertical direction and, for example, compared to an instance in which an X-cut is used, improvement of the electric field efficiency by simply reducing the electrode spacing is difficult.

Embodiments of an optical waveguide device and a method of manufacturing of a thin-film LN optical waveguide device are described in detail with reference to the accompanying drawings. In the embodiments, a thin-film LN optical modulator is described as an example of the optical waveguide device. The thin-film LN optical modulator is provided in an optical transmitting unit for optical transmission, converts an electrical signal input thereto into an optical signal, and transmits the optical signal.

Figure 1:
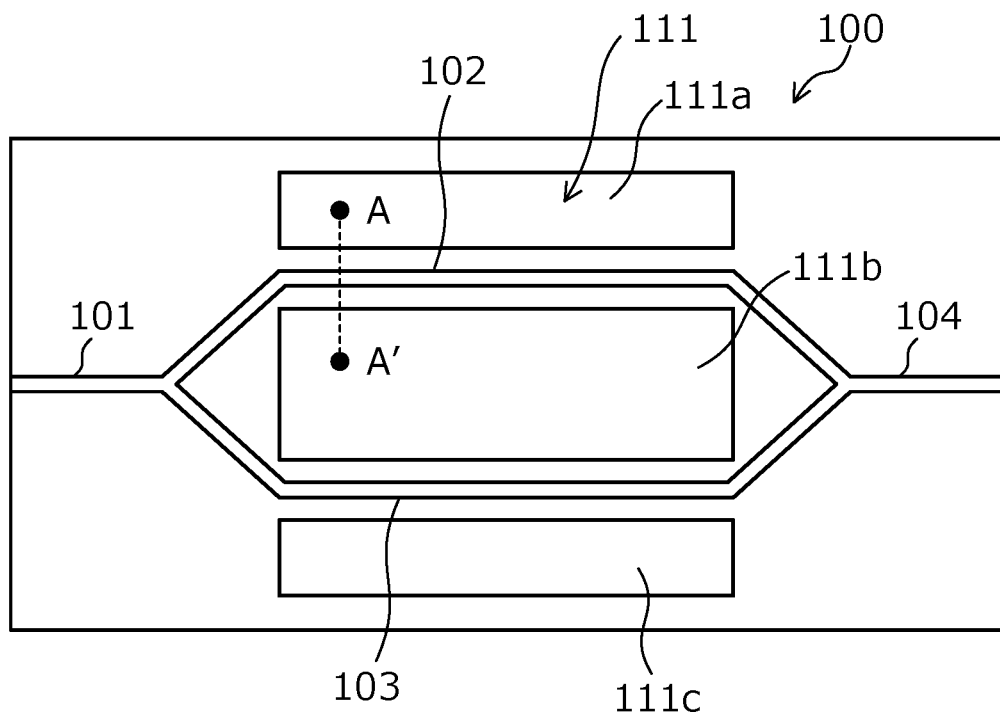
FIG. 1 is a plan view depicting a thin-film LN optical modulator according to an embodiment.
Figure 2A:
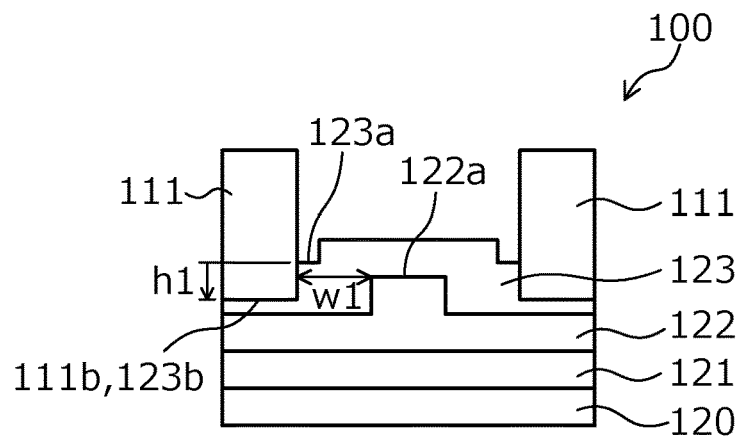
FIG. 2A is a cross-sectional view of the thin-film LN optical modulator according to the embodiment.
Figure 2B:
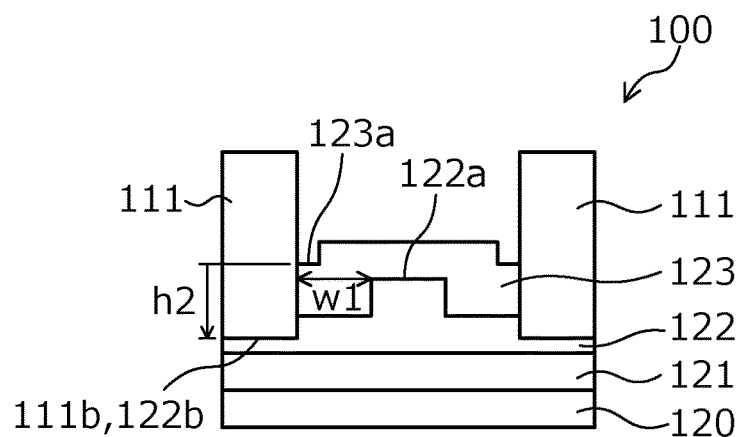
FIG. 2B is a cross-sectional view of the thin-film LN optical modulator according to the embodiment.
Figure 2C:
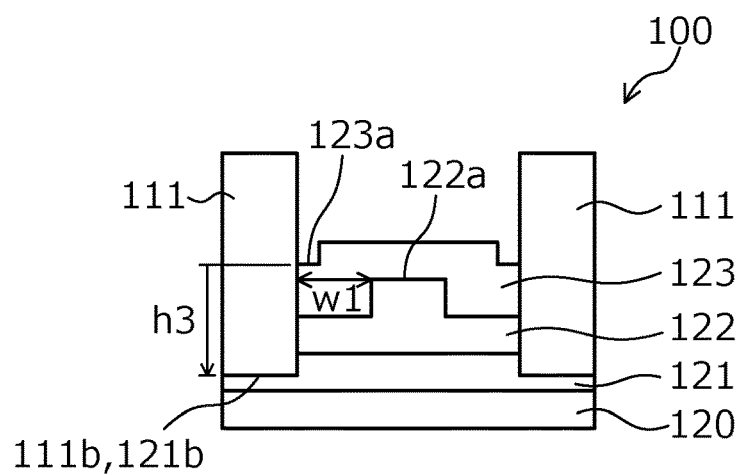
FIG. 2C is a cross-sectional view of the thin-film LN optical modulator according to the embodiment.

FIG. 1 is a plan view depicting the thin-film LN optical modulator according to the embodiment; FIGS. 2A, 2B, and 2C are cross-sectional views of the thin-film LN optical modulator according to the embodiment. FIGS. 2A, 2B, and 2C depict cross-sections along cutting line A-A' in FIG. 1. In the embodiments, a thin-film LN optical modulator 100 is described as an example of the optical waveguide device.

The thin-film LN optical modulator 100 described herein is a Mach-Zehnder-type optical modulator and voltage is applied to a Mach-Zehnder interferometer formed by an optical waveguide exhibits the electro-optic effect, whereby the thin-film LN optical modulator 100 modulates light propagated in the optical waveguide.

An optical waveguide 101 branches into two optical waveguides 102, 103 that are combined into an optical waveguide 104. Electrodes 111 (111a, 111b, 111c) are provided on each side of the branched optical waveguides 102, 103.

When a voltage V of the electrodes 111 is 0, light input to the optical waveguide 101 is branched into two and proceeds through the optical waveguides 102, 103, is combined by the optical waveguide 104 and output. Further, when a voltage $V_\pi$ is applied to the electrodes 111, a reverse electric field occurs at the optical waveguides 102, 103, and due to refractive index variation of the optical waveguides 102, 103, a difference in phase occurs between the lights traveling therein. In an instance of a voltage that causes the difference in phase to be π, the two branches of light interfere with each other and cancel each other out, however, by varying the applied voltage between 0-$V_\pi$, optical output that is intensity-modulated may be obtained.

As depicted in FIGS. 2A, 2B, and 2C, the thin-film LN optical modulator 100 is a structure in which an intermediate layer 121, a thin-film LN layer 122, and a buffer layer 123 are stacked on a substrate 120. The substrate 120, for example, may contain LN, Si, $SiO_2$, etc. In the thin-film LN layer 122, lithium niobate ($LiNbO_3$) having X-cut crystal orientation is used and etched, whereby a ridge-type optical waveguide is formed. A convex ridge portion functions as an optical waveguide 122a through which light travels. The optical waveguide 122a depicted in FIGS. 2A, 26, and 2C corresponds to the optical waveguide 102 depicted in FIG. 1.

In the embodiment, X-cut lithium niobate is used for the thin-film LN layer 122. As a result, the need to apply electric field in a vertical direction of the optical waveguide 122a is eliminated and the electrodes 111 are disposed at the sides of the optical waveguide 122a, whereby light may be confined to an extremely small region (the optical waveguide 122a). Further, by reducing an interval between the optical waveguide 122a and the electrodes 111, a structure is enabled that maximizes an advantage of thin-film LN, that is, the electric field efficiency may be improved.

The intermediate layer 121 and the buffer layer 123 are provided to strengthen confinement of light to the optical waveguide 122a formed in the thin-film LN layer 122. The intermediate layer 121 and the buffer layer 123 contain a material having a refractive index lower than a refractive index of the thin-film LN layer 122, for example, $SiO_2$.

As a technique of manufacturing a stacked structure, direct bonding of wafers may be used. In this instance, an adhesive layer may be provided between layers when an adhesive layer for bonding is necessary therebetween.

In the embodiment, near the optical waveguide 122a, positions where the electrodes 111 are to be formed are lowered with a predetermined thickness left as is as the buffer layer 123.

In a configuration example depicted in FIG. 2A, the buffer layer 123 having a predetermined thickness is stacked on the thin-film LN layer 122. Here, the buffer layer 123 is formed having a constant thickness at the sides and a top of the optical waveguide 122a, in a shape that follows a convex shape of the ridge portion of the optical waveguide 122a. Here, in the buffer layer 123, recesses 123a corresponding to the convex shape of the optical waveguide 122a are formed at both sides of the optical waveguide 122a, a predetermined distance from the optical waveguide 122a.

Thereafter, in the buffer layer 123, portions thereof where the electrodes 111 are to be provided (the recesses 123a) are etched. With the optical waveguide 122a as a center, the electrodes 111 are provided at both sides of the optical waveguide 122a, a predetermined distance therefrom. The buffer layer 123 is etched, whereby steps 123b are formed respectively at the portions of the buffer layer 123 where electrodes 111 are to be provided.

Subsequently, the electrodes 111 are formed on the steps 123b of the buffer layer 123. The electrodes 111, for example, may be formed by vapor deposition of gold (Au), etc. Thus, positions of the steps 123b in a height direction are positions that are lower, by a height h1, than positions of the recesses 123a of the buffer layer 123 before the etching thereof.

Further, the electrodes 111 are provided on the steps 123b of the buffer layer 123, whereby the electrodes 111 are a distance (width) w1 from the optical waveguide 122a and may be as close as possible to the optical waveguide 122a. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed, whereby the thickness of the buffer layer 123 itself centered around the optical waveguide 122a is ensured and the electrodes 111 may be disposed near the optical waveguide 122a.

As a result, the tradeoff related to the thickness of the buffer layer is eliminated and the thin-film LN optical modulator 100 having low scattering loss and high electric field efficiency may be realized.

In configuration examples depicted in FIGS. 2B and 2C, the amount of etching is greater than that in configuration example depicted in FIG. 2A. In the configuration example depicted in FIG. 2B, an entire area of the portions of the buffer layer 123 where the electrodes 111 are formed (the recesses 123a) is etched. In addition, portions of the thin-film LN layer 122 are also etched a predetermined amount, thereby forming steps 122b in the thin-film LN layer 122. Further, the electrodes 111 are formed on the steps 122b of the thin-film LN layer 122 by vapor deposition, etc.

As a result, positions of the steps 122b in the height direction are positions lower by a height h2 than the positions of the recesses 123a of the buffer layer 123 before the etching thereof. Further, bottom surfaces 111b of the electrodes 111 are positioned and provided on the steps 122b of the thin-film LN layer 122, whereby the electrodes 111 have the distance (width) w1 from the optical waveguide 122a and may be as close as possible to the optical waveguide 122a.

In the configuration example depicted in FIG. 2C, an entire area of the portions of the buffer layer 123 where the electrodes 111 are to be provided (the recesses 123a) is etched. In addition, an entire area of the thin-film LN layer 122 and the intermediate layer 121 is also etched a predetermined amount, thereby forming steps 121b in portions of the intermediate layer 121. Further, the electrodes 111 are formed on the steps 121b of the intermediate layer 121.

Thus, positions of the steps 121b in the height direction are positions lower by a height h3 than the positions of the recesses 123a of the buffer layer 123 before the etching thereof. Further, the electrodes 111 are provided having the bottom surfaces 111b thereof positioned on the steps 121b of the intermediate layer 121, whereby the electrodes 111 have the distance (width) w1 from the optical waveguide 122a and may be as close as possible to the optical waveguide 122a.

The etching amount in the configuration example depicted in FIG. 2B is greater than that in the configuration example depicted in FIG. 2A while the etching amount in the configuration example depicted in FIG. 2C is greater than that in the configuration example depicted in FIG. 2B. While the electric field efficiency is enhanced the greater is the etching amount, process difficulty also increases and therefore, an optimal structure is selected with consideration of necessary characteristics such as electric field efficiency, ease of manufacture, etc.

Figure 3A:
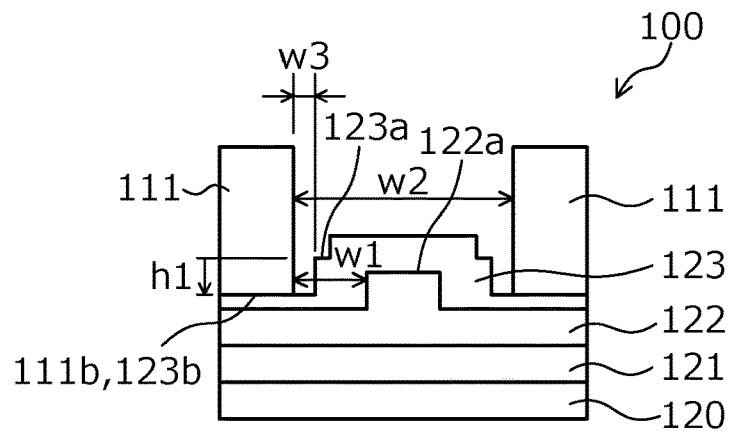
FIG. 3A is a cross-sectional view of another configuration example of the thin-film LN optical modulator according to the embodiment.
Figure 3B:
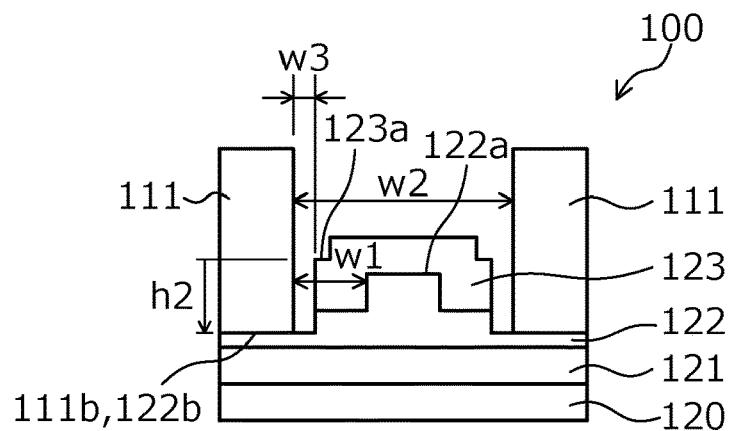
FIG. 3B is a cross-sectional view of another configuration example of the thin-film LN optical modulator according to the embodiment.
Figure 3C:
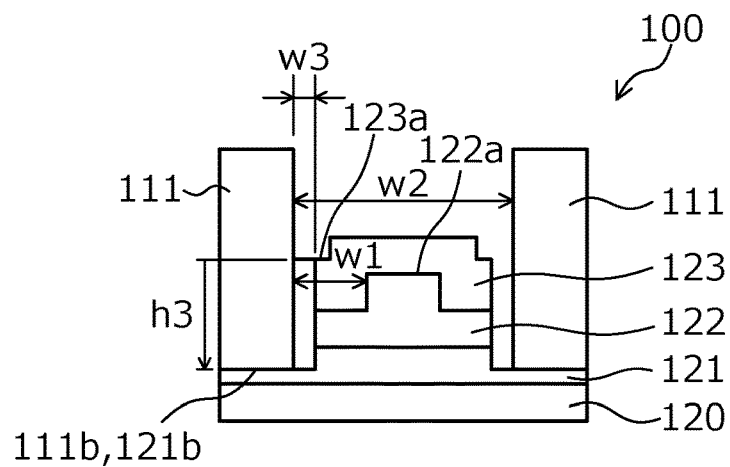
FIG. 3C is a cross-sectional view of another configuration example of the thin-film LN optical modulator according to the embodiment.

FIGS. 3A, 3B, and 3C are cross-sectional views of other configuration examples of the thin-film LN optical modulator according to the embodiment. FIGS. 3A, 3B, and 3C also correspond to cross-sections along cutting line A-A' in FIG. 1. In the configuration examples described using FIGS. 2A, 2B, and 2C, examples in which sidewalls of the electrodes 111 are in contact with the buffer layer 123 are described.

Nonetheless, in actuality, due to manufacturing tolerances, etc., the sidewalls of the electrodes 111 may be provided separate from the buffer layer 123. For example, during etching when openings of a mask formed on the buffer layer 123 are formed or when the electrodes 111 are formed, a gap may occur between a sidewall of the electrodes 111 and a sidewall of the buffer layer 123 due to shifts in arrangement positions, opening diameter error, etc. of the openings of the mask provided on the buffer layer 123. FIGS. 3A, 3B, and 3C depict configuration examples of instances in which the sidewalls of the electrodes 111 are apart from the buffer layer 123.

In the configuration example depicted in FIG. 3A, the buffer layer 123 having a predetermined thickness is stacked on the thin-film LN layer 122. Here, at a surface of the buffer layer 123, the recesses 123a are formed corresponding to the convex ridge portion of the optical waveguide 122a. Thereafter, the portions of the buffer layer 123 where the electrodes 111 are to be formed (the recesses 123a) are etched.

During this etching, with the optical waveguide 122a as a center, a portion (width w2) of the buffer layer 123 spanning formation regions of the steps 123b is masked and openings corresponding to the steps 123b are provided in the mask. Further, portions of the buffer layer 123 are etched from the openings of the mask. By this etching, the steps 123b are formed in portions of the buffer layer 123 where the electrodes 111 are to be formed.

Further, the electrodes 111 are formed on the steps 123b of the buffer layer 123. During formation of the electrodes 111, with the optical waveguide 122a as a center, a portion of the buffer layer 123 (the width w2) spanning formation regions of the steps 123b is masked and openings corresponding to the steps 123b are provided in the mask. Subsequently, the electrodes 111 are formed by vapor deposition from the openings of the mask.

Here, during etching when openings of the mask formed on the buffer layer 123 are formed or when the electrodes 111 are formed, a gap w3 occurs between a sidewall of the electrodes 111 and a sidewall of the buffer layer 123 due to shifts in arrangement positions, opening diameter error, etc. of the openings of the mask provided on the buffer layer 123. The gap w3, for example, occurs when an opening diameter of the mask during formation of the electrodes 111 is larger than an opening diameter of the mask during etching of the buffer layer 123.

In this manner, even in an instance in which the gap w3 occurs between a sidewall of the electrodes 111 and a sidewall of the buffer layer 123, positions of the steps 123b in the height direction are positions lower by the height h1 than the positions of the recesses 123a of the buffer layer 123 before the etching thereof. Further, the electrodes 111 are provided on the steps 123b of the buffer layer 123, whereby the electrodes 111 have the distance (width) w1 from the optical waveguide 122a and may be as close as possible to the optical waveguide 122a. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed. As a result, even in an instance in which the gap w3 is between a sidewall of the electrodes 111 and a sidewall of the buffer layer 123, the thickness of the buffer layer 123 itself centered around the optical waveguide 122a is ensured and the electrodes 111 may be disposed near the optical waveguide 122a.

As a result, the tradeoff related to the thickness of the buffer layer is eliminated and the thin-film LN optical modulator 100 having low scattering loss and high electric field efficiency may be realized.

In configuration examples depicted in FIGS. 3B and 3C, the amount of etching is greater than that in configuration example depicted in FIG. 3A. In the configuration example depicted in FIG. 3B, an entire area of the portions of the buffer layer 123 where the electrodes 111 are formed (the recesses 123a) is etched. In addition, portions of the thin-film LN layer 122 are also etched a predetermined amount, thereby forming steps 122b in the portions of the thin-film LN layer 122. Further, the electrodes 111 are formed on the steps 122b of the thin-film LN layer 122 by vapor deposition, etc. Here, similarly to FIG. 3A, due to shifts in the position of the mask, opening diameter error, etc., the gap w3 is formed between a sidewall of the electrodes 111, the thin-film LN layer 122, and a sidewall of the buffer layer 123.

In this manner, even in an instance in which the gap w3 occurs between a sidewall of the electrodes 111, the thin-film LN layer 122, and a sidewall of the buffer layer 123, the positions of the steps 122b in the height direction are positions lower by the height h2 than the positions of the recesses 123a of the buffer layer 123 before the etching thereof. Further, the electrodes 111 are provided having the bottom surfaces 111b thereof positioned on the steps 122b of the thin-film LN layer 122, whereby the electrodes 111 have the distance (width) w1 from the optical waveguide 122a and may be as close as possible to the optical waveguide 122a.

In the configuration example depicted in FIG. 3C, an entire area of the portions of the buffer layer 123 where the electrodes 111 are to be provided (the recesses 123a) is etched. In addition, an entire area of the thin-film LN layer 122 and the intermediate layer 121 is also etched a predetermined about, thereby forming steps 121b in portions of the intermediate layer 121. Further, the electrodes 111 are formed on the steps 121b of the intermediate layer 121. Here, similarly to FIG. 3A, due to shifts in the position of the mask, opening diameter error, etc., the gap w3 is formed between a sidewall of the electrodes 111, the thin-film LN layer 122, and a sidewall of the buffer layer 123.

In this manner, the gap w3 is assumed to occur between a sidewall of the electrodes 111, the intermediate layer 121, the thin-film LN layer 122, and a sidewall of the buffer layer 123. In this instance as well, the positions of the steps 121b in the height direction are positions lower by the height h3 than the positions of the recesses 123a of the buffer layer 123 before the etching thereof. Further, the electrodes 111 are provided having the bottom surfaces 111b thereof positioned on the steps 121b of the intermediate layer 121, whereby the electrodes 111 have the distance (width) w1 from the optical waveguide 122a and may be as close as possible to the optical waveguide 122a.

The etching amount in the configuration example depicted in FIG. 3B is greater than that in the configuration example depicted in FIG. 3A while the etching amount in the configuration example depicted in FIG. 3C is greater than that in the configuration example depicted in FIG. 3B. While the electric field efficiency is enhanced the greater is the etching amount, process difficulty also increases and therefore, an optimal structure is selected with consideration of necessary characteristics such as electric field efficiency, ease of manufacture, etc.

Figure 4A:
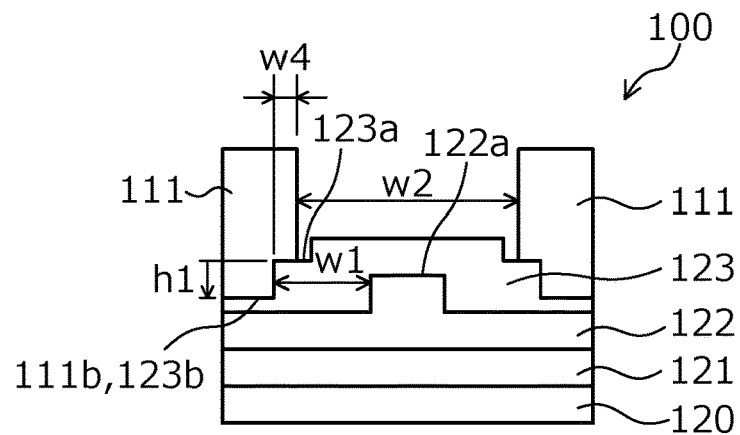
FIG. 4A is a cross-sectional view of another configuration example of the thin-film LN optical modulator according to the embodiment.
Figure 4B:
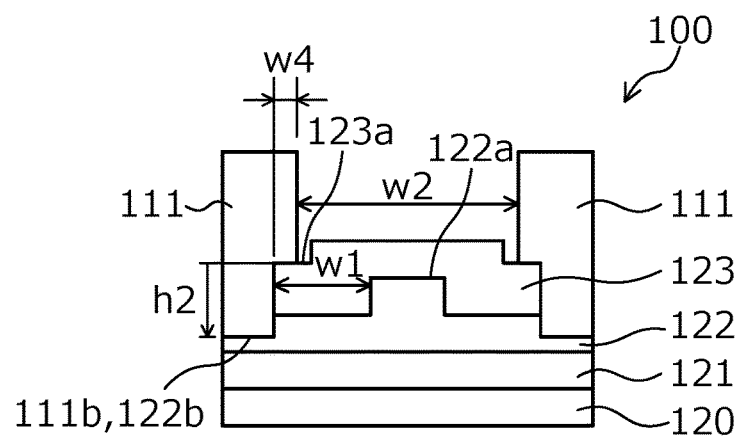
FIG. 4B is a cross-sectional view of another configuration example of the thin-film LN optical modulator according to the embodiment.
Figure 4C:
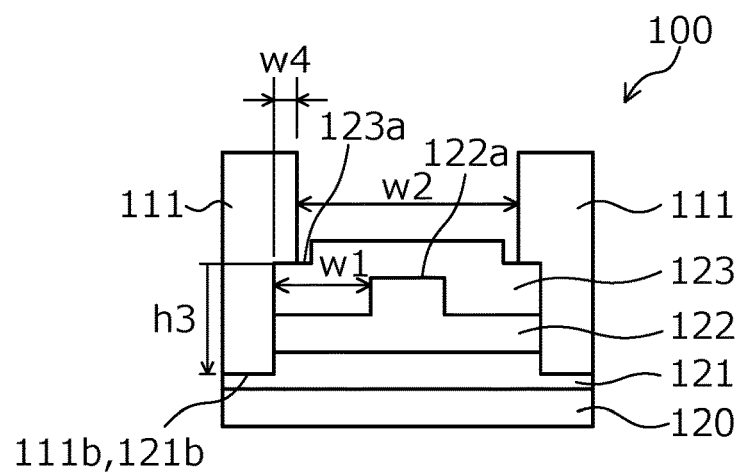
FIG. 4C is a cross-sectional view of another configuration example of the thin-film LN optical modulator according to the embodiment.

FIGS. 4A, 4B, and 4C are cross-sectional views of other configuration examples of the thin-film LN optical modulator according to the embodiment. FIGS. 4A, 4B, and 4C also correspond to cross-sections along cutting line A-A' in FIG. 1. In the configuration examples described using FIGS. 3A, 3B, and 3C, examples in which the sidewalls of the electrodes 111 are apart from the buffer layer 123 by the gap w3 are described.

Contrary to the examples described with reference to FIGS. 3A, 3B, and 3C, due to manufacturing tolerances, etc., a part (sidewall) of the electrodes 111 may be positioned closer to the optical waveguide 122a than are the steps 123b of the buffer layer 123, which corresponds to the gap w3 being eliminated. For example, during etching when openings of a mask formed on the buffer layer 123 are formed or when the electrodes 111 are formed, shifts in arrangement positions, opening diameter error, etc. of the openings of the mask provided on the buffer layer 123 are assumed to occur. As a result, a part (sidewall) of the electrodes 111 may be positioned in a part of the recesses 123a of the buffer layer 123. FIGS. 4A, 4B, and 4C depict configuration examples of instances in which a part (sidewall closest to the optical waveguide 122a) of the electrodes 111 is formed in a shape so as to ride on the recesses 123a of the buffer layer 123.

In the configuration example depicted in FIG. 4A, the buffer layer 123 having a predetermined thickness is stacked on the thin-film LN layer 122. Here, at the surface the buffer layer 123, the recesses 123a are formed corresponding to the convex ridge portion of the optical waveguide 122a. Thereafter, the portions of the buffer layer 123 where the electrodes 111 are to be formed (the recesses 123a) are etched. During this etching, with the optical waveguide 122a as a center, a portion (width w2) of the buffer layer 123 spanning formation regions of the steps 123b is masked and openings corresponding to the steps 123b are provided in the mask. Further, portions of the buffer layer 123 are etched from the openings of the mask. By this etching, the steps 123b are formed in portions of the buffer layer 123 where the electrodes 111 are to be formed.

Subsequently, the electrodes 111 are formed on the steps 123b of the buffer layer 123. During formation of the electrodes 111, with the optical waveguide 122a as a center, a portion of the buffer layer 123 (the width w2) spanning formation regions the steps 123b is masked and openings corresponding to the steps 123b are provided in the mask. Subsequently, the electrodes 111 are formed by vapor deposition from the openings of the mask.

Here, during etching when openings of the mask formed on the buffer layer 123 are formed or when the electrodes 111 are formed, due to shifts in arrangement positions, opening diameter error, etc. of the openings of the mask provided on the buffer layer 123, a part of the sidewalls of the electrodes 111 is positioned in the recesses 123a of the buffer layer 123. The electrodes 111 are shaped and positioned so as to have a portion having a width w4 (corresponds to amount of overlap) riding on the recesses 123a. The width w4, for example, occurs in an instance in which an opening diameter of the mask during formation of the electrodes 111 is smaller than an opening diameter of the mask during etching of the buffer layer 123.

In this manner, even in an instance in which the sidewalls of the electrodes 111 are partially positioned in the recesses 123a of the buffer layer 123, the positions of the steps 123b in the height direction are positions lower by the height h1 than the positions of the recesses 123*a* of the buffer layer 123 before the etching thereof. Further, the electrodes 111 are provided on the steps 123*b* of the buffer layer 123, whereby the electrodes 111 have the distance (width) w1 from the optical waveguide 122*a* and may be as close as possible to the optical waveguide 122*a*. The width w1 corresponds to a predetermined thickness when the buffer layer 123 is stacked on the thin-film LN layer 122 and has an effect of confining light to the optical waveguide 122*a*.

In this manner, the steps 123*b* are formed in portions of the buffer layer 123 where the electrodes 111 are to be formed. As a result, even in an instance in which the sidewalls of the electrodes 111 are positioned having the width w4 on the recesses 123*a* of the buffer layer 123, the thickness of the buffer layer 123 itself centered around the optical waveguide 122*a* is ensured and the electrodes 111 may be disposed near the optical waveguide 122*a*.

As a result, the tradeoff related to the thickness of the buffer layer is eliminated and the thin-film LN optical modulator 100 having low scattering loss and high electric field efficiency may be realized.

In configuration examples depicted in FIGS. 4B and 4C, the amount of etching is greater than that in configuration example depicted in FIG. 4A. In the configuration example depicted in FIG. 4B, an entire area of the portions of the buffer layer 123 where the electrodes 111 are formed (the recesses 123*a*) is etched. In addition, portions of the thin-film LN layer 122 are also etched a predetermined amount, thereby forming the steps 122*b* in these portions of the thin-film LN layer 122. Further, the electrodes 111 are formed on the steps 122*b* of the thin-film LN layer 122 by vapor deposition, etc. Here, similarly to FIG. 4A, due to shifts in the position of the mask, opening diameter error, etc., the sidewalls of the electrodes 111 are shaped and positioned so as to have a portion having the width w4 riding on the recesses 123*a* of the buffer layer 123 on the thin-film LN layer 122.

In this manner, even in an instance in which the sidewalls of the electrodes 111 are positioned having a portion thereof of the width w4 on the recesses 123*a* of the buffer layer 123 on the thin-film LN layer 122, the positions of the steps 122*b* in the height direction are positions lower by the height h2 than the positions of the recesses 123*a* of the buffer layer 123 before the etching thereof. Further, the electrodes 111 are provided having the bottom surfaces 111*b* thereof partially positioned on the steps 122*b* of the thin-film LN layer 122, whereby the electrodes 111 have the distance (width) w1 from the optical waveguide 122*a* and may be as close as possible to the optical waveguide 122*a*.

In the configuration example depicted in FIG. 4C, an entire area of the portions of the buffer layer 123 where the electrodes 111 are to be provided (the recesses 123*a*) is etched. In addition, an entire area of the thin-film LN layer 122 and the intermediate layer 121 is also etched a predetermined about, thereby forming steps 121*b* in portions of the intermediate layer 121. Further, the electrodes 111 are formed on the steps 121*b* of the intermediate layer 121. Here, similarly to FIG. 4A, due to shifts in the position of the mask, opening diameter error, etc., the sidewalls of the electrodes 111 are shaped and positioned so as to have a portion having the width w4 riding on the recesses 123*a* of the buffer layer 123 on the thin-film LN layer 122.

In this manner, even in an instance in which the sidewalls of the electrodes 111 are positioned having a portion thereof of the width w4 on the recesses 123*a* of the buffer layer 123 on the thin-film LN layer 122, the positions of the steps 121*b* in the height direction are positions lower by the height h3 than the positions of the recesses 123*a* of the buffer layer 123 before the etching thereof. Further, the electrodes 111 are provided having the bottom surfaces 111*b* thereof partially positioned on the steps 121*b* of the intermediate layer 121, whereby the electrodes 111 have the distance (width) w1 from the optical waveguide 122*a* and may be as close as possible to the optical waveguide 122*a*.

The etching amount in the configuration example depicted in FIG. 4B is greater than that in the configuration example depicted in FIG. 4A while the etching amount in the configuration example depicted in FIG. 4C is greater than that in the configuration example depicted in FIG. 4B. While the electric field efficiency is enhanced the greater is the etching amount, process difficulty also increases and therefore, an optimal structure is selected with consideration of necessary characteristics such as electric field efficiency, ease of manufacture, etc.

Figure 5:
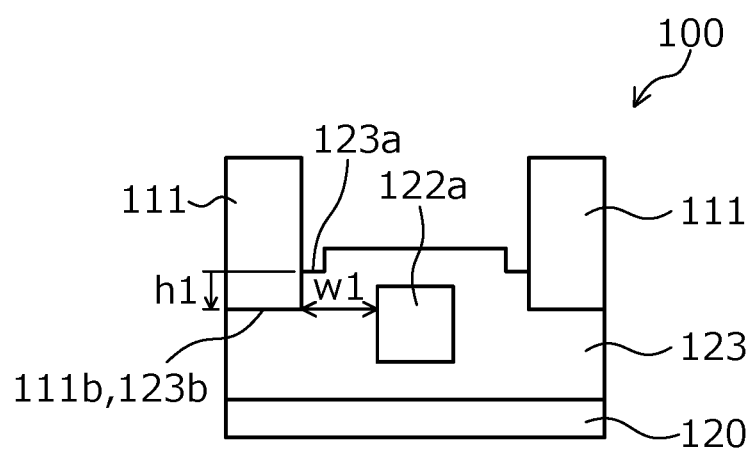
FIG. 5 is a cross-sectional view of another configuration example of the thin-film LN optical modulator according to the embodiment.

FIG. 5 is a cross-sectional view of another configuration example of the thin-film LN optical modulator according to the embodiment. In the configuration example depicted in FIG. 5, the optical waveguide 122*a* is assumed to be a rectangular core (channel type). In the thin-film LN optical modulator 100 depicted in FIG. 5, the buffer layer 123 is stacked on the substrate 120 and the optical waveguide 122*a* having a rectangular shape in a cross-sectional view thereof is formed in the buffer layer 123. The buffer layer 123 strengthens the confinement of light to the optical waveguide 122*a*.

Further, at the surface of the buffer layer 123, the recesses 123*a* are formed corresponding to the rectangular shape of the optical waveguide 122*a*. Thereafter, the portions of the buffer layer 123 where the electrodes 111 are to be formed (the recesses 123*a*) are etched. By this etching, the steps 123*b* are formed in portions of the buffer layer 123 where the electrodes 111 are to be formed.

Subsequently, the electrodes 111 are formed on the steps 123*b* of the buffer layer 123. As a result, the positions of the steps 123*b* in the height direction are lower by the height h1 than the positions of the recesses 123*a* of the buffer layer 123 before the etching thereof. Further, the electrodes 111 are provided on the steps 123*b* of the buffer layer 123, whereby the electrodes 111 have the distance (width) w1 from the optical waveguide 122*a* and may be as close as possible to the optical waveguide 122*a*. The width w1 corresponds to a predetermined thickness when the buffer layer 123 is stacked on the thin-film LN layer 122 and has an effect of confining light to the optical waveguide 122*a*.

In this manner, even in the configuration example of the thin-film LN optical modulator 100 having the optical waveguide 122*a* of a rectangular core type, the steps 123*b* are formed in portions of the buffer layer 123 where the electrodes 111 are to be formed. As a result, the thickness of the buffer layer 123 itself centered around the optical waveguide 122*a* is ensured and the electrodes 111 may be disposed near the optical waveguide 122*a*.

Even in the thin-film LN optical modulator 100 having the optical waveguide 122*a* of the rectangular core type as such, as described above, the etching amount of the portions of the buffer layer 123 where the electrodes 111 are formed is not limited to that for the position of the height h1. Within a range of the thickness of the buffer layer 123, the etching amount may be for a deeper position, for example, increased to a position corresponding to the height h2 or the height h3 (corresponds to FIGS. 2B, 2C, etc.). Further, due to positioning error of the electrodes 111 when a mask is used, the electrodes 111 may be positioned such that the gap w3 is formed with respect to the recesses 123*a* of the buffer layer 123 (corresponds to FIGS. 3A, 3B, and 3C). Further, the electrodes 111 may be positioned to be in a portion of the recesses 123a of the buffer layer 123 (corresponds to FIGS. 4A, 4B, and 4C). In any of these instances, the steps 123b are formed, whereby the thickness of the buffer layer 123 itself centered around the optical waveguide 122a is ensured and the electrodes 111 may be disposed near the optical waveguide 122a.

As a result, even in the thin-film LN optical modulator 100 having the optical waveguide 122a of a rectangular core type, the tradeoff related to the thickness of the buffer layer is eliminated and the thin-film LN optical modulator 100 having low scattering loss and high electric field efficiency may be realized.

Figure 6A:
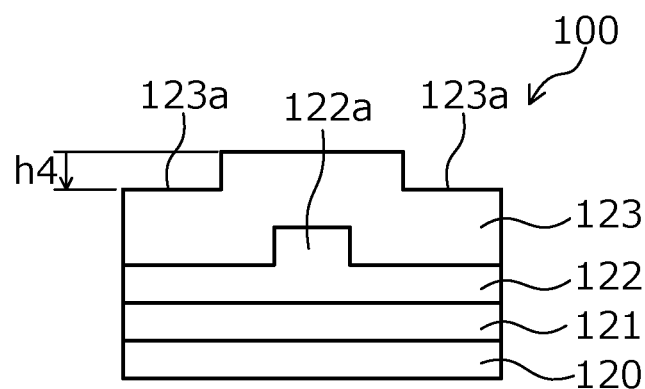
FIG. 6A is a manufacturing process diagram of a configuration example of the thin-film LN optical modulator according to the embodiment.
Figure 6B:
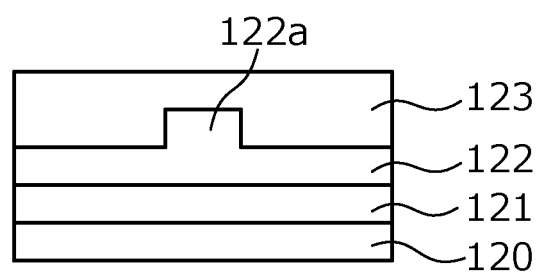
FIG. 6B is a manufacturing process diagram of the configuration example of the thin-film LN optical modulator according to the embodiment.
Figure 6C:
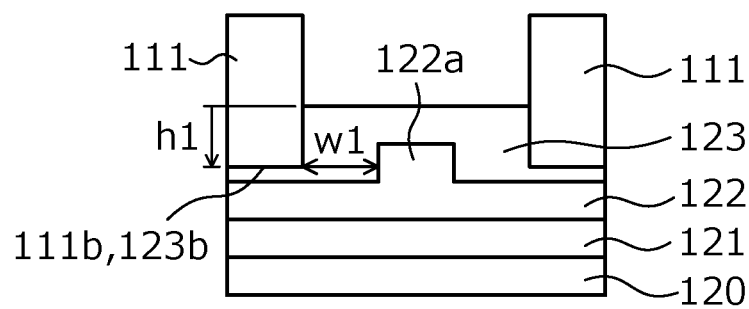
FIG. 6C is a manufacturing process diagram of the configuration example of the thin-film LN optical modulator according to the embodiment.

FIGS. 6A, 6B, and 6C are manufacturing process diagrams of a configuration example of the thin-film LN optical modulator according to the embodiment. In the configuration example depicted in FIGS. 6A, 6B, and 6C, the recesses 123a are not provided in the buffer layer 123 and the electrodes 111 are formed after the buffer layer 123 is planarized.

FIGS. 6A, 6B, and 6C each depict a manufacturing process. First, as depicted in FIG. 6A, the intermediate layer 121 and the thin-film LN layer 122 are stacked on the substrate 120. The thin-film LN layer 122 is etched, thereby forming the optical waveguide 122a (ridge portion) having a protruding shape. Thereafter, the buffer layer 123 is formed on an entire area of the surface of the thin-film LN layer 122 where the optical waveguide 122a having a protruding shape is formed. Here, at a surface of the buffer layer 123, the recesses 123a are formed corresponding to the convex ridge portion of the optical waveguide 122a.

Next, as depicted in FIG. 6B, a portion of the surface of the buffer layer 123 having a height h4 corresponding to the recesses 123a is removed, whereby the surface of the buffer layer 123 is planarized. This process of planarizing the buffer layer 123, for example, is performed in instances in which depending on the application state of electric field to the optical waveguide 122a, planarization provides more favorable application of the electric field.

Subsequently, as depicted in FIG. 6C, the portions of the buffer layer 123 where the electrodes 111 are to be provided are etched by the height h1. By this etching, the steps 123b are formed in the buffer layer 123 at the portions thereof where the electrodes 111 are to be provided. Subsequently, the electrodes 111 are formed on the steps 123b of the buffer layer 123.

As a result, the positions of the steps 123b in the height direction are positions lower by the height h1 than the position of the surface of the buffer layer 123. Subsequently, the electrodes 111 are provided on the steps 123b of the buffer layer 123, whereby the electrodes 111 have the distance (width) w1 from the optical waveguide 122a and may be as close as possible to the optical waveguide 122a. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed, whereby the thickness of the buffer layer 123 itself centered around the optical waveguide 122a is ensured and the electrodes 111 may be disposed near the optical waveguide 122a.

As a result, the tradeoff related to the thickness of the buffer layer is eliminated and the thin-film LN optical modulator 100 having low scattering loss and high electric field efficiency may be realized.

Further, even in an instance in which a planarization process is performed to the surface of the buffer layer 123, as described above, the amount of etching of the portions of the buffer layer 123 where the electrodes 111 are to be provided is not limited to that for the position of the height h1. For example, the etching amount may be for a deeper position, for example, increased to a position corresponding to the height h2 or the height h3 (refer to FIGS. 2B, 2C, etc.).

Figure 7A:
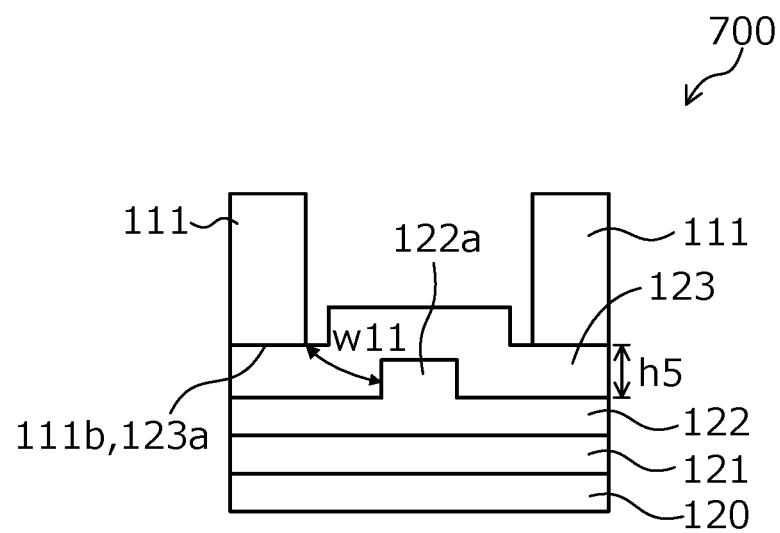
FIG. 7A is a cross-sectional view of a configuration example of a conventional thin-film LN optical modulator used for comparison with the embodiment.
Figure 7B:
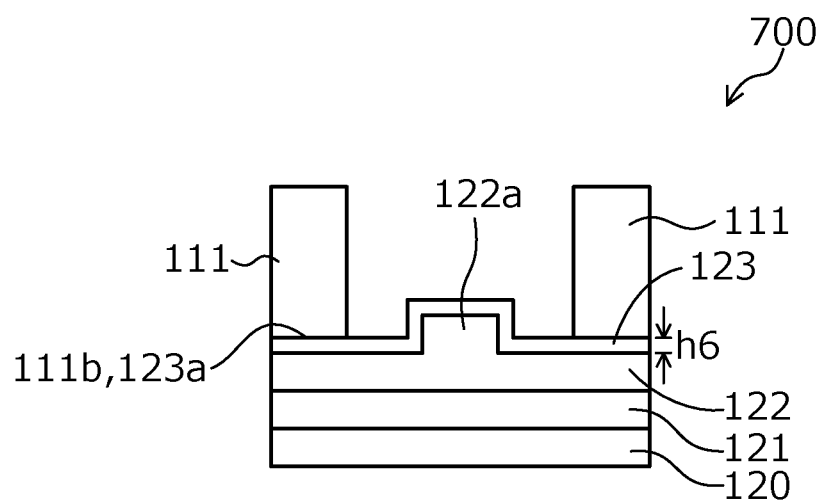
FIG. 7B is a cross-sectional view of a configuration example of a conventional thin-film LN optical modulator used for comparison with the embodiment.

FIGS. 7A and 7B are cross-sectional views of configuration examples of conventional thin-film LN optical modulators used for comparison with the embodiment. In FIGS. 7A and 7B, parts similar to parts in the embodiment are indicated by the same reference characters used in the embodiment. In a conventional thin-film LN optical modulator 700, the electrodes 111 are disposed on the recesses 123a of the buffer layer 123.

FIG. 7A depicts an instance in which the thickness of the buffer layer 123 is assumed to be a relatively thick predetermined thickness h5. In this instance, the buffer layer 123 is formed having the constant thickness h5 at the sides and the top of the optical waveguide 122a, in a shape that follows the convex shape of the ridge portion of the optical waveguide 122a. Here, the recesses 123a are formed in the buffer layer 123, at the surface of portions thereof separate from the optical waveguide 122a.

Therefore, a distance (width) w11 between the optical waveguide 122a and the electrodes 111 is a distance that is wider (longer) than w1 described in the embodiment. As a result, in the conventional thin-film LN optical modulator 700 having the structure depicted in FIG. 7A, the electric field efficiency decreases and the size of the optical modulator increases as compared to the embodiment.

On the other hand, as depicted in FIG. 7B, the thickness of the buffer layer 123 is assumed to be a relatively thin predetermined thickness h6. In this instance, the buffer layer 123 is formed having the constant thickness h6 at the sides and the top of the optical waveguide 122a, in a shape that follows the convex shape of the ridge portion of the optical waveguide 122a.

In this instance, corresponding to the roughness of the sidewalls occurring when the optical waveguide 122a is formed, similar sidewall roughness further occurs at the sidewalls of the buffer layer 123. Here, in an instance in which the buffer layer 123 is formed to be thinner, confinement of light to the optical waveguide 122a weakens and scattering loss occurs due to the roughness of the sidewalls of the buffer layer 123. As a result, in the conventional thin-film LN optical modulator 700 having the structure depicted in FIG. 7B, scattering loss increases as compared to the embodiment.

In contrast to such conventional techniques, in the embodiment, a predetermined thickness is ensured as the thickness of a portion of the buffer layer 123 covering the optical waveguide 122a and the steps 123b are provided in the buffer layer 123 at portions thereof where the electrodes 111 are to be provided. As a result, the electrodes 111 may be close to the optical waveguide 122a. Further, scattering loss due to the buffer layer 123 having a predetermined thickness is reduced and the electrodes 111 are disposed close to the optical waveguide 122a, whereby the electric field efficiency may be enhanced.

As described above, the thin-film LN optical modulator 100 has the intermediate layer, the thin-film LN layer of X-cut lithium niobate, and the buffer layer stacked on the substrate, the optical waveguide having a ridge shape formed in the thin-film LN layer, and the electrodes disposed on both sides of the optical waveguide. Further, the bottom surfaces of the electrodes are provided at positions lower than the position of the surface of the buffer layer. As a result, due to the buffer layer having a predetermined thickness with respect to the sidewalls and the top of the optical waveguide, light may be confined to the optical waveguide, scattering loss may be reduced, and the electrodes may be as close as possible to the optical waveguide, enabling the electric field efficiency to be enhanced.

Further, in the thin-film LN optical modulator 100, the bottom surfaces of the electrodes may be provided on the steps positioned at the predetermined depth h1 in the buffer layer. Further, the bottom surfaces of the electrodes may be provided on the steps positioned at the predetermined depth h2 from the surface of the buffer layer, in the thin-film LN layer. Further, the bottom surfaces of the electrodes may be provided on the steps positioned at the predetermined depth h3 from the surface of the buffer layer, in the intermediate layer. These depth positions may be easily obtained by changing the etching amount of the portions where the electrodes are to be provided.

Further, in the thin-film LN optical modulator 100, the recesses that occur in the buffer layer stacked on the thin-film LN layer as a consequence of the ridge shape of the optical waveguide formed in the thin-film LN layer may be planarized. For example, the recesses may be removed by etching, whereby the surface of the buffer layer may be planarized. This planarization, for example, may be performed in instances in which depending on the application state of electric field to the optical waveguide, planarization provides more favorable application of the electric field.

Further, the thin-film LN optical modulator 100 may be configured to have the buffer layer stacked on the substrate, the optical waveguide of a rectangular core type containing X-cut lithium niobate in the buffer layer, and the electrodes disposed on both sides of the optical waveguide. In this instance as well, the bottom surfaces of the electrodes are provided at positions lower than the position of the surface of the buffer layer. As a result, due to the buffer layer having a predetermined thickness with respect to the sidewalls and the top of the optical waveguide, light may be confined to the optical waveguide, scattering loss may be reduced, and the electrodes may be as close as possible to the optical waveguide, enabling the electric field efficiency to be enhanced.

Further, in the embodiments, configuration is not a matter of simply increasing the thickness of the buffer layer to reduce scattering loss due to sidewall roughness or a matter of simply providing the electrodes close to the optical waveguide. In the embodiment, the buffer layer is provided having a predetermined thickness at the top and the sidewalls of the optical waveguide, whereby light may be confined to the optical waveguide and scattering loss may be reduced. In addition, the bottom surfaces of the electrodes are provided at positions lower than the position of the surface of the buffer layer, whereby the electrode may be as close as possible to the optical waveguide and the electric field efficiency may be enhanced. In this manner, according to the embodiments, the tradeoff between reducing scattering loss and improving the electric field efficiency may be eliminated, thereby enabling both reduction of the scattering loss and improvement of the electric field efficiency. As a result, the size of the thin-film LN optical modulator may be further reduced.

According to one aspect of the embodiments, an optical waveguide device having low scattering loss and high electric field efficiency may be provided.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide device, comprising:
   a substrate;
   a buffer layer stacked on the substrate and containing $SiO_2$;
   an optical waveguide of a rectangular core type containing an X-cut lithium niobate, the optical waveguide having a top, bottom, right and left surfaces all of which are in contact with the $SiO_2$ of the buffer layer; and
   a plurality of electrodes provided, respectively, at a first side and a second side of the optical waveguide, wherein
   the electrodes are disposed so that respective bottom surfaces thereof are at positions lower than a position of a surface of the buffer layer.

* * * * *